United States Patent
Vincent et al.

(10) Patent No.: US 12,517,200 B2
(45) Date of Patent: Jan. 6, 2026

(54) COIL ELEMENTS OF A RADIO FREQUENCY COIL UTILIZING BUNDLES OF CONDUCTIVE FIBERS ENTWINED TOGETHER

(71) Applicant: GE Precision Healthcare LLC, Waukesha, WI (US)

(72) Inventors: Jana Michelle Vincent, Aurora, OH (US); Victor Taracila, Orange Village, OH (US); Meghan Blanks, Beavercreek, OH (US); Fraser John Laing Robb, Aurora, OH (US)

(73) Assignee: GE Precision Healthcare LLC, Wauwatosa, WI (US)

( * ) Notice: Subject to any disclaimer, the term of this patent is extended or adjusted under 35 U.S.C. 154(b) by 165 days.

(21) Appl. No.: 18/406,529

(22) Filed: Jan. 8, 2024

(65) Prior Publication Data
US 2025/0224467 A1  Jul. 10, 2025

(51) Int. Cl.
*G01R 33/34* (2006.01)

(52) U.S. Cl.
CPC .  *G01R 33/34084* (2013.01); *G01R 33/34007* (2013.01)

(58) Field of Classification Search
CPC ........ G01R 33/34084; G01R 33/34007; G01R 33/341; G01R 33/3415
See application file for complete search history.

(56) References Cited

U.S. PATENT DOCUMENTS

| | | | |
|---|---|---|---|
| 11,656,302 B2 | 5/2023 | Rispoli et al. | |
| 2005/0253582 A1* | 11/2005 | Giaquinto | G01R 33/3415 324/318 |
| 2012/0146643 A1* | 6/2012 | Saha | G01R 33/34076 324/318 |
| 2018/0372817 A1* | 12/2018 | Rahmat-Samii | G01R 33/34084 |
| 2022/0229132 A1 | 7/2022 | Chen et al. | |
| 2022/0252684 A1* | 8/2022 | Rispoli | G01R 33/341 |
| 2022/0334202 A1* | 10/2022 | Vincent | A61B 5/6801 |
| 2023/0266414 A1 | 8/2023 | Dalveren et al. | |

FOREIGN PATENT DOCUMENTS

WO   202101570   1/2021

OTHER PUBLICATIONS

U.S. Appl. No. 18/406,520, filed Jan. 8, 2024, Vincent.
(Continued)

*Primary Examiner* — G. M. A Hyder
(74) *Attorney, Agent, or Firm* — Fletcher Yoder, P.C.

(57) ABSTRACT

A radio frequency (RF) receiving coil assembly for a magnetic resonance imaging (MRI) system includes a flexible enclosure. The radio frequency receiving coil assembly also includes a flexible anchoring material disposed within the flexible enclosure. The radio frequency coil assembly further includes a radio frequency coil disposed within the flexible enclosure. The radio frequency coil includes a plurality of flexible coil elements coupled to the flexible anchoring material. Each flexible coil element of the plurality of flexible coil elements includes a plurality of bundles of conductive fibers entwined together. Each bundle of the plurality of bundles includes a plurality of the conductive fibers.

20 Claims, 11 Drawing Sheets

(56) References Cited

OTHER PUBLICATIONS

Mncent et al. "Conductive Thread-Based Stretchable and Flexible Radiofrequency Coils for Magnetic Resonance Imaging," IEEE Trans Biomed Eng, Aug. 1, 2020, 26 pgs.

Vincent et al., "Stitching Stretchable Radiofrequency Coils for MRI: A Conductive Thread and Athletic Fabric Approach", IEEE Trans Biomed Eng, Jul. 1, 2019, 14 pgs.

Zhang "Novel Electro-textile Antenna Designs Supporting Magnetic Resonance Imaging and Communication Systems," University of California, 2018, 138 pgs.

Nohava et al. "Flexibile Multi-Turn Multi-Gap Coaxial RF Coils: Design Concept and Implementation for Magnetic Reasonance Imaging at 3 and 7 Tesla," IEEE Transactions on Medical Imaging, vol. 40, No. 4, Apr. 4, 2021, 12 pgs.

* cited by examiner

Coil Layout

Side 1

Side 2

Coil Layout

Layer 1

Layer 2

Layer 3

Layer 4

COIL ELEMENTS OF A RADIO FREQUENCY COIL UTILIZING BUNDLES OF CONDUCTIVE FIBERS ENTWINED TOGETHER

BACKGROUND

The subject matter disclosed herein relates to medical imaging and, more particularly, to a radio frequency receiving coil assembly that includes a radio frequency coil having coil elements made of bundles of conductive fibers entwined together.

Non-invasive imaging technologies allow images of the internal structures or features of a patient/object to be obtained without performing an invasive procedure on the patient/object. In particular, such non-invasive imaging technologies rely on various physical principles (such as the differential transmission of X-rays through a target volume, the reflection of acoustic waves within the volume, the paramagnetic properties of different tissues and materials within the volume, the breakdown of targeted radionuclides within the body, and so forth) to acquire data and to construct images or otherwise represent the observed internal features of the patient/object.

During magnetic resonance imaging, when a substance such as human tissue is subjected to a uniform magnetic field (polarizing field $B_0$), the individual magnetic moments of the spins in the tissue attempt to align with this polarizing field, but precess about it in random order at their characteristic Larmor frequency. If the substance, or tissue, is subjected to a magnetic field (excitation field $B_1$) which is in the x-y plane and which is near the Larmor frequency, the net aligned moment, or "longitudinal magnetization", $M_z$, may be rotated, or "tipped", into the x-y plane to produce a net transverse magnetic moment, Mt. A signal is emitted by the excited spins after the excitation signal $B_1$ is terminated and this signal may be received and processed to form an image.

When utilizing these signals to produce images, magnetic field gradients ($G_x$, $G_y$, and $G_z$) are employed. Typically, the region to be imaged is scanned by a sequence of measurement cycles in which these gradient fields vary according to the particular localization method being used. The resulting set of received nuclear magnetic resonance (NMR) signals are digitized and processed to reconstruct the image using one of many well-known reconstruction techniques.

A coil array typically utilizes wire-based or printed circuit board-based coil elements. The potential configurations for the conventional coil elements are limited due to this. In addition, the flexibility (if flexible) of conventional coil elements is limited. Further, the conventional coil arrays cost more and weigh more.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a radio frequency (RF) receiving coil assembly for a magnetic resonance imaging (MRI) system is provided. The radio frequency receiving coil assembly includes a flexible enclosure. The radio frequency receiving coil assembly also includes a flexible anchoring material disposed within the flexible enclosure. The radio frequency coil assembly further includes a radio frequency coil disposed within the flexible enclosure. The radio frequency coil includes a plurality of flexible coil elements coupled to the flexible anchoring material. Each flexible coil element of the plurality of flexible coil elements includes a plurality of bundles of conductive fibers entwined together. Each bundle of the plurality of bundles includes a plurality of the conductive fibers.

In another embodiment, a method for manufacturing a radio frequency (RF) receiving coil assembly for a magnetic resonance imaging (MRI) system is provided. The method includes providing a flexible anchoring material. The method also includes coupling a plurality of flexible coil elements to the flexible anchoring material to form a radio frequency coil. Each flexible coil element of the plurality of flexible coil elements includes a plurality of bundles of conductive fibers entwined together. Each bundle of the plurality of bundles includes a plurality of the conductive fibers. The method further includes disposing the flexible anchoring material and the radio frequency coil within a flexible enclosure.

In a further embodiment, a magnetic resonance imaging (MRI) system is provided. The magnetic resonance imaging system includes an imaging portion having a radio frequency receiving coil assembly. The radio frequency receiving coil assembly includes a flexible enclosure. The radio frequency receiving coil assembly also includes a flexible anchoring material disposed within the flexible enclosure. The radio frequency receiving coil assembly further includes a radio frequency coil disposed within the flexible enclosure. The radio frequency coil includes a plurality of flexible coil elements sewn on the flexible anchoring material. Each flexible coil element of the plurality of flexible coil elements includes a plurality of bundles of conductive fibers entwined together. Each bundle of the plurality of bundles includes a plurality of the conductive fibers. The plurality of bundles of conductive fibers entwined together is utilized as a thread to sew the plurality of flexible coil elements on the flexible anchoring material.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
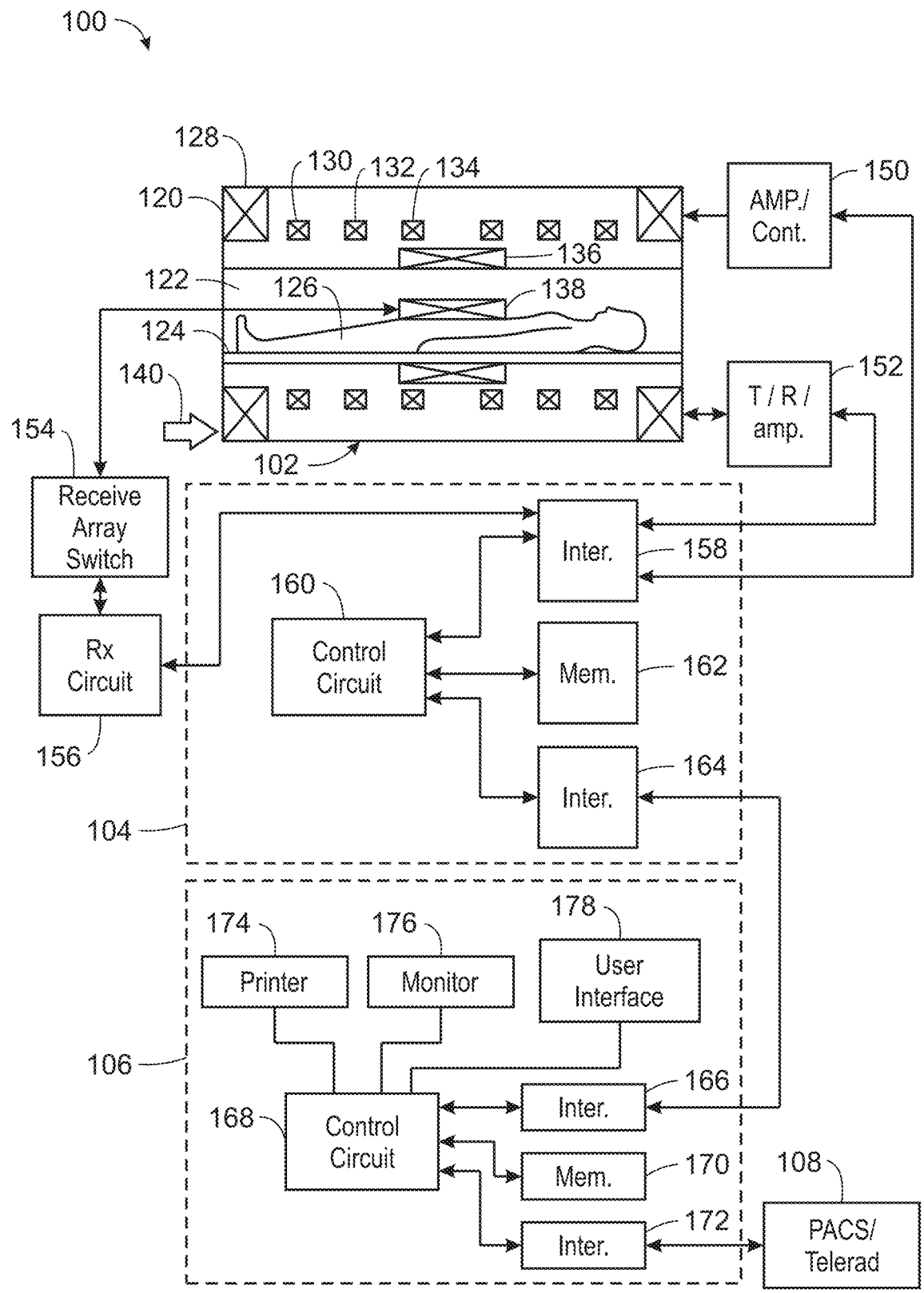
FIG. 1 illustrates an embodiment of a magnetic resonance imaging (MRI) system suitable for use with the disclosed technique.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing coil elements of various embodiments of the present subject matter, the articles "a," "an," "the," and "said" are intended to mean that there are one or more of the coil elements. The terms "comprising," "including," and "having" are intended to be inclusive and mean that there may be additional coil elements other than the listed coil elements. Furthermore, any numerical examples in the following discussion are intended to be non-limiting, and thus additional numerical values, ranges, and percentages are within the scope of the disclosed embodiments.

The present disclosure provides for coil elements of a radio frequency coil that utilizes bundles of conductive fibers entwined (e.g., braided, twisted, or woven) together. In particular, the present disclosure provides for a radio frequency coil assembly (e.g., body coil) of a magnetic resonance imaging system having coil elements (e.g., channel or loops) coupled (e.g., sewn) on a flexible anchoring material. Although discussed in the context of a body coil, the disclosed embodiments can be utilized with respect to magnetic resonance compatible sensors. Although discussed in the context of a body coil utilized with a magnetic resonance imaging system, the coil can be utilized in multi-nuclear applications (e.g., with positron emission tomography (PET)/magnetic resonance imaging system).

The disclosed embodiments include a radio frequency (RF) receiving coil assembly for a magnetic resonance imaging (MRI) system that includes a flexible enclosure. The radio frequency receiving coil assembly also includes a flexible anchoring material disposed within the flexible enclosure. The radio frequency coil assembly further includes a radio frequency coil disposed within the flexible enclosure. The radio frequency coil includes a plurality of flexible coil elements coupled to the flexible anchoring material. Each flexible coil element of the plurality of flexible coil elements includes a plurality of bundles of conductive fibers entwined together. Each bundle of the plurality of bundles includes a plurality of the conductive fibers.

In certain embodiments, the plurality of flexible coil elements are sewn on the flexible anchoring material utilizing the plurality of bundles of conductive fibers entwined together as a thread. In certain embodiments, the plurality of flexible coil elements are sewn on the flexible anchoring material as a top thread. In certain embodiments, the plurality of flexible coil elements are sewn on the flexible anchoring material as a bottom thread. In certain embodiments, the plurality of flexible coil elements are sewn on the flexible anchoring material as a top thread and a bottom thread.

In certain embodiments, the plurality of flexible coil elements are sewn on the flexible anchoring material in a zig-zag pattern (or meandering pattern), wherein the plurality of flexible coil elements are configured to be stretchable due to the zig-zag pattern. In certain embodiments (e.g., with the flexible coil elements sewn in a zig-zag pattern), the flexible anchoring material layer is stretchable. In certain embodiments, the plurality of flexible coil elements are sewn on the flexible anchoring material via a linear stitch pattern.

In certain embodiments, each conductive fiber of the plurality of the conductive fibers (for each bundle) includes a non-conductive core and a conductive cover disposed about the non-conductive core (e.g., plastic or polymers). In certain embodiments, each conductive fiber of the plurality of the conductive fibers (of a bundle) includes a conductive core, and the plurality of bundles entwined together has a non-conductive cover disposed about a respective bundle. In certain embodiments, each conductive fiber of the plurality of the conductive fibers (of a bundle) includes a conductive core, and the plurality of bundles entwined together has a non-conductive cover disposed about a respective bundle. In certain embodiments, the plurality of bundles entwined together are bare (i.e., the entwined bundles lack a covering such as shielding or dielectric layer).

In certain embodiments, the plurality of flexible coil elements may be made of Litz wire, wire bundles, tinsel wire bundles, plated filament bundle, woven filament bundles, elasticized or stretchable filaments bundles (e.g., where both the filament and conductive plating are stretchable), or conductive thread bundles. In certain embodiments, the conductive fibers may be inherently stretchable. The conductive fibers within a respective bundles may be entwined (e.g., woven, braided, or twisted) in a variety of patterns. The bundles that are entwined (e.g., woven, braided, or twisted) in a variety of patterns. In certain embodiments, the shape of the flexible coil elements may vary and can be any shape (e.g., elliptical, circular, square, rectangular, etc.). In certain embodiments, the flexible coil element may follow a straight path along the shape. In certain embodiments, the flexible coil element may meander (e.g., zig-zag) along the shape. In certain embodiments, the meandering enables the flexible coil element to be stretchable. In certain, embodiments, the flexible coil elements may be coupled to the flexible anchoring material in a multi-turn configuration (e.g., varying in a number of turns and/or gaps). In certain embodiments (e.g., where the filament and conductive plating are stretchable in elasticized or stretchable filament bundles), the elasticized or stretchable bundles may be easily incorporated into a stretchable anchoring material with a standard straight stitch.

In certain embodiments, the flexible anchoring material layer is stretchable. In certain embodiments, the flexible anchoring material layer is made of a heat dissipating material. In certain embodiments, the flexible anchoring material layer is magnetic resonance compatible and does not generate a proton signal. In certain embodiments, the flexible anchoring material layer is made of a film (e.g., plastic film). In certain embodiments, the flexible anchoring material layer is made of a fabric.

In certain embodiments, the radio frequency receiving coil assembly includes a single-tuned coil (e.g., a single-proton frequency coil). In certain embodiments, the radio frequency receiving coil includes a multi-tuned coil (e.g., multi-nuclear coil) were each frequency is transparent to each other in overlap. For example, a first set of flexible coil elements on the flexible anchoring material could be tuned to a first frequency (e.g., for hydrogen) and a second set of flexible coil elements on the flexible anchoring material could be tuned to a second frequency (e.g., for carbon-13 or multi-nuclear spectroscopy (MNS)) different from the first frequency.

In certain embodiments, a method for manufacturing a radio frequency (RF) receiving coil assembly for a magnetic resonance imaging (MRI) system includes providing a flexible anchoring material. The method also includes coupling a plurality of flexible coil elements to the flexible anchoring material to form a radio frequency coil. Each flexible coil element of the plurality of flexible coil elements includes a plurality of bundles of conductive fibers entwined together. Each bundle of the plurality of bundles includes a plurality of the conductive fibers. The method further includes disposing the flexible anchoring material and the radio frequency coil within a flexible enclosure. In certain embodiments, coupling the plurality of flexible coil elements to the flexible anchoring material includes sewing on the plurality of flexible coil elements on the flexible anchoring material utilizing the plurality of bundles of conductive fibers entwined together as a thread. In certain embodiments, the plurality of flexible coil elements are sewn on the flexible anchoring material as a top thread. In certain embodiments, the plurality of flexible coil elements are sewn on the flexible anchoring material as a bottom thread. In certain embodiments, the plurality of flexible coil elements are sewn on the flexible anchoring material as a top thread and a bottom thread. In certain embodiments, the plurality of flexible coil elements are sewn on the flexible anchoring material in a zig-zag pattern (or meandering pattern), wherein the plurality of flexible coil elements are configured to be stretchable due to the zig-zag pattern. In certain embodiments (e.g., with the flexible coil elements sewn in a zig-zag pattern), the flexible anchoring material layer is stretchable. In certain embodiments, the plurality of flexible coil elements are sewn on the flexible anchoring material via a linear stitch pattern.

In certain embodiments, magnetic resonance imaging system includes an imaging portion having a radio frequency receiving coil assembly. The radio frequency receiving coil assembly includes a flexible enclosure. The radio frequency receiving coil assembly also includes a flexible anchoring material disposed within the flexible enclosure. The radio frequency receiving coil assembly further includes a radio frequency coil disposed within the flexible enclosure. The radio frequency coil includes a plurality of flexible coil elements sewn on the flexible anchoring material. Each flexible coil element of the plurality of flexible coil elements includes a plurality of bundles of conductive fibers entwined together. Each bundle of the plurality of bundles includes a plurality of the conductive fibers. The plurality of bundles of conductive fibers entwined together is utilized as a thread to sew the plurality of flexible coil elements on the flexible anchoring material.

The disclosed embodiments enable the utilization of bundles of conductive fibers entwined (e.g., braided, twisted, or woven) together to form coil elements of a radio frequency coil. The disclosed embodiments provide for lighter weight and more flexible alternatives to traditional wire-based conductors, while being cheaper but providing similar conductivity and performance. The disclosed embodiments enable for a coil assembly that is both lighter and more flexible, thus, enhancing patient comfort as well enabling easier positioning of the coil assembly that could lead to higher throughput when utilizing the magnetic resonance imaging system. The disclosed embodiments enable for the manufacturing of a coil at reduced cost due to the decreased cost of the conductors and in a quicker manner (e.g., using sewing or embroidery techniques). The disclosed embodiments enable easy sewing of the coil elements on an anchoring fabric or heat dissipative fabric to provide a wearable style coil array that is highly adaptive to the anatomy on which it is utilized. The disclosed embodiments enable the bundles of the conductive fibers to be woven or braided into custom configurations that reduce resistance, equally distribute current, and improve performance. The disclosed embodiments enables the radio frequency coil to reduce reflections (e.g., due to less metal) in a positron emission tomography scanner when utilized in a PET/MR scanner.

With the preceding in mind, FIG. 1 a magnetic resonance imaging (MRI) system 100 is illustrated schematically as including a scanner 102, scanner control circuitry 104, and system control circuitry 106. According to the embodiments described herein, the magnetic resonance imaging system 100 is generally configured to perform MR imaging.

System 100 additionally includes remote access and storage systems or devices such as picture archiving and communication systems (PACS) 108, or other devices such as teleradiology equipment so that data acquired by the system 100 may be accessed on- or off-site. In this way, MR data may be acquired, followed by on-or off-site processing and evaluation. While the magnetic resonance imaging system 100 may include any suitable scanner or detector, in the illustrated embodiment, the system 100 includes a full body scanner 102 having a housing 120 through which a bore 122 is formed. A table 124 is moveable into the bore 122 to permit a patient 126 to be positioned therein for imaging selected anatomy within the patient.

Scanner 102 includes a series of associated coils for producing controlled magnetic fields for exciting the gyromagnetic material within the anatomy of the subject being imaged. Specifically, a primary magnet coil 128 is provided for generating a primary magnetic field, $B_0$, which is generally aligned with the bore 122. A series of gradient coils 130, 132, and 134 permit controlled magnetic gradient fields to be generated for positional encoding of certain gyromagnetic nuclei within the patient 126 during examination sequences. A radio frequency (RF) coil 136 (e.g., radio frequency transmit coil) is configured to generate radio frequency pulses for exciting the certain gyromagnetic nuclei within the patient. In addition to the coils that may be local to the scanner 102, the system 100 also includes a set of receiving coils or radio frequency receiving coils 138 (e.g., an array of coils) configured for placement proximal (e.g., against) to the patient 126. As an example, the receiving coils 138 can include cervical/thoracic/lumbar (CTL) coils, head coils, single-sided spine coils, and so forth. Generally, the receiving coils 138 are placed close to or on top of the patient 126 so as to receive the weak radio frequency signals (weak relative to the transmitted pulses generated by the scanner coils) that are generated by certain gyromagnetic nuclei within the patient 126 as they return to their relaxed state.

The various coils of system 100 are controlled by external circuitry to generate the desired field and pulses, and to read emissions from the gyromagnetic material in a controlled manner. In the illustrated embodiment, a main power supply 140 provides power to the primary field coil 128 to generate the primary magnetic field, $B_0$. A power input (e.g., power from a utility or grid), a power distribution unit (PDU), a power supply (PS), and a driver circuit 150 may together provide power to pulse the gradient field coils 130, 132, and 134. The driver circuit 150 may include amplification and control circuitry for supplying current to the coils as defined by digitized pulse sequences output by the scanner control circuitry 104.

Another control circuit 152 is provided for regulating operation of the radio frequency coil 136. Circuit 152 includes a switching device for alternating between the active and inactive modes of operation, wherein the radio frequency coil 136 transmits and does not transmit signals, respectively. Circuit 152 also includes amplification circuitry configured to generate the radio frequency pulses. Similarly, the receiving coils 138 are connected to switch 154, which is capable of switching the receiving coils 138 between receiving and non-receiving modes. Thus, the receiving coils 138 resonate with the radio frequency signals produced by relaxing gyromagnetic nuclei from within the patient 126 while in the receiving mode, and they do not resonate with radio frequency energy from the transmitting coils (i.e., coil 136) so as to prevent undesirable operation while in the non-receiving mode. Additionally, a receiving circuit 156 is configured to receive the data detected by the receiving coils 138 and may include one or more multiplexing and/or amplification circuits.

It should be noted that while the scanner 102 and the control/amplification circuitry described above are illustrated as being coupled by a single line, many such lines may be present in an actual instantiation. For example, separate lines may be used for control, data communication, power transmission, and so on. Further, suitable hardware may be disposed along each type of line for the proper handling of the data and current/voltage. Indeed, various filters, digitizers, and processors may be disposed between the scanner and either or both of the scanner and system control circuitry 104, 106.

As illustrated, scanner control circuitry 104 includes an interface circuit 158, which outputs signals for driving the gradient field coils and the radio frequency coil and for receiving the data representative of the magnetic resonance signals produced in examination sequences. The interface circuit 158 is coupled to a control and analysis circuit 160. The control and analysis circuit 160 executes the commands for driving the circuit 150 and circuit 152 based on defined protocols selected via system control circuit 106.

Control and analysis circuit 160 also serves to receive the magnetic resonance signals and performs subsequent processing before transmitting the data to system control circuit 106. Scanner control circuit 104 also includes one or more memory circuits 162, which store configuration parameters, pulse sequence descriptions, examination results, and so forth, during operation.

Interface circuit 164 is coupled to the control and analysis circuit 160 for exchanging data between scanner control circuitry 104 and system control circuitry 106.

In certain embodiments, the control and analysis circuit 160, while illustrated as a single unit, may include one or more hardware devices. The system control circuit 106 includes an interface circuit 166, which receives data from the scanner control circuitry 104 and transmits data and commands back to the scanner control circuitry 104. The control and analysis circuit 168 may include a CPU in a multi-purpose or application specific computer or workstation. Control and analysis circuit 168 is coupled to a memory circuit 170 to store programming code for operation of the magnetic resonance imaging system 100 and to store the processed image data for later reconstruction, display and transmission. The programming code may execute one or more algorithms that, when executed by a processor, are configured to perform reconstruction of acquired data as described below. In certain embodiments, the memory circuit 170 may store one or more neural networks for reconstruction of acquired data as described below. In certain embodiments, image reconstruction may occur on a separate computing device having processing circuitry and memory circuitry.

An additional interface circuit 172 may be provided for exchanging image data, configuration parameters, and so forth with external system components such as remote access and storage devices 108. Finally, the system control and analysis circuit 168 may be communicatively coupled to various peripheral devices for facilitating operator interface and for producing hard copies of the reconstructed images. In the illustrated embodiment, these peripherals include a printer 174, a monitor 176, and user interface 178 including devices such as a keyboard, a mouse, a touchscreen (e.g., integrated with the monitor 176), and so forth.

Figure 2:
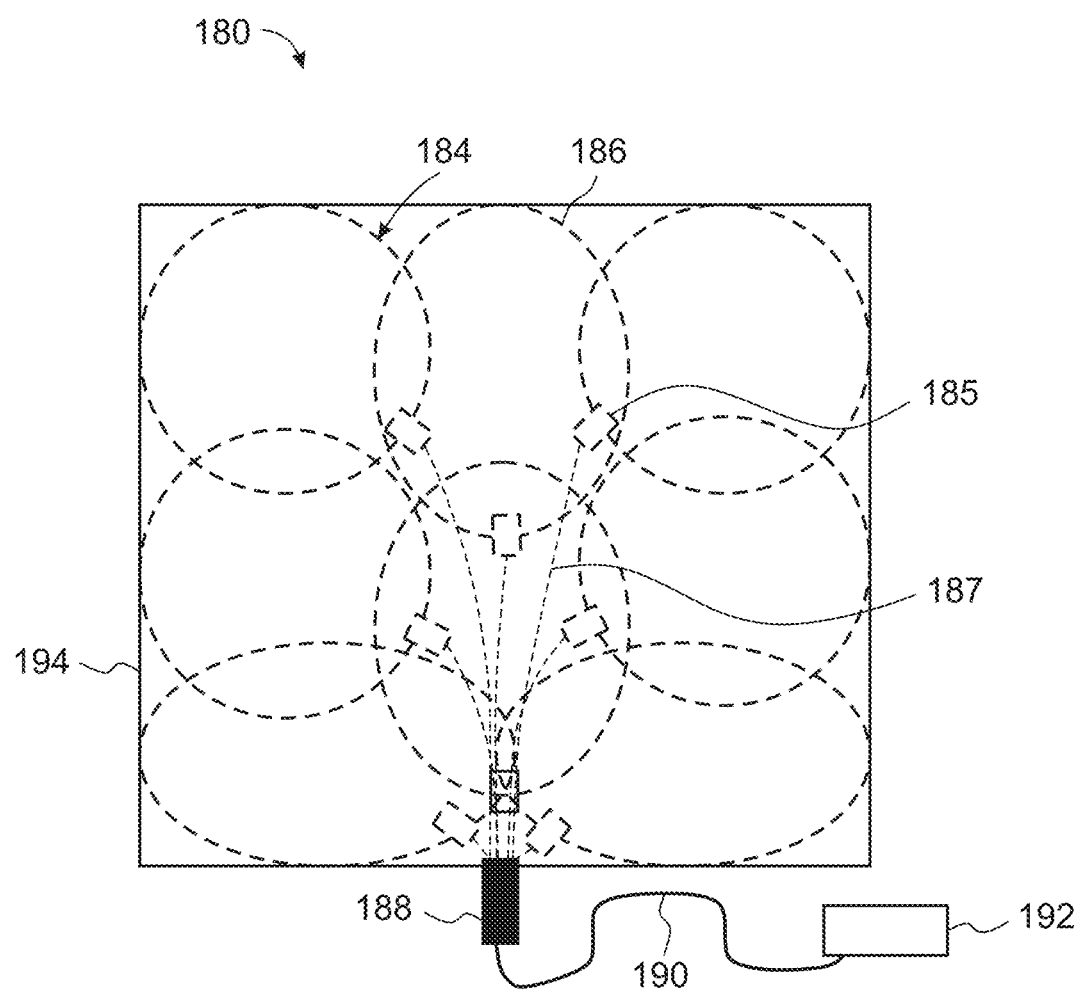
FIG. 2 is a schematic diagram of a radio frequency (RF) coil assembly having coil elements formed utilizing a plurality of bundles of conductive fibers entwined together, in accordance with aspects of the present disclosure.

FIG. 2 is a schematic diagram of a radio frequency coil assembly 180 (e.g., radio frequency receiving coil assembly) having a layered and/or dual-sided arrangement for coil elements. The radio frequency coil assembly 180 may be utilized in an magnetic resonance imaging system (e.g., magnetic resonance imaging system 100 in FIG. 1). The radio frequency coil assembly 180 includes an radio frequency coil 184 having a plurality of coil elements 186 (e.g., loops or channels). Each element 186 is coupled to an electronics unit 185 coupled to a coil-interfacing cable 187. The coil-interfacing cables 187 of each of the coil elements 186 is coupled to an electrical connector interface or interface circuitry 188 (e.g., a balun such as integrated balun cable harness which may act as an radio frequency trap). The electrical connector interface 188 is coupled (via a cable 190) to a P connector 192 (e.g., port connector) that enables the radio frequency coil assembly 180 to be coupled (e.g., via wired connection) to the interface of the magnetic resonance imaging system that couples imaging components to processing components. In certain embodiments, the radio frequency coil assembly 180 may lack a wired connection and may be configured to be utilized wirelessly (e.g., for coupling imaging components to wireless components) with the magnetic resonance imaging system during an magnetic resonance imaging scan.

Each element 186 may consist of linked resonator coil elements coupled to a printed circuit board module (e.g., the electronics unit 185). Each electronics unit 185 may include various components (e.g., a decoupling circuit, an impedance inverter circuit, and a pre-amplifier). The radio frequency coil 184 may be designed utilizing AIR™ coil technology from General Electric Healthcare. This enables the radio frequency coil 184 to be lightweight and flexible. Each element 186 is made of bundles of conductive fibers that entwined together. In certain embodiments, each element 186 may stretch (e.g., due to a zig-zag or meandering structure). In addition, the coil elements 186 of the radio frequency coil 184 are transparent, thus, aiding signal-to-noise ratios.

The radio frequency coil 184 is disposed within a flexible enclosure 194 (e.g., blanket). As depicted, the flexible enclosure 194 has a rectangular shape. In certain embodiments, the flexible enclosure 194 may have a square shape or other shape. In certain embodiments, the flexible enclosure 194 includes holes or openings to increase a flexibility of the radio frequency coil assembly 180 (and the flexible enclosure 194). Each hole or opening may be radially located within the element 186. In certain embodiments, the flexible enclosure 194 may include deformable material within. The deformable material may include foam, memory foam, expanded foam, polyurethane foam, gels such as hydrogel, cells of water, or other suitable deformable material. When the subject lies on the radio frequency coil assembly 180, the subject will sink into the deformable material and the radio frequency coil 184 may conform to the subject's unique shape and, thus, be right up against the patient's body. As depicted, the interface circuitry 188 is disposed within the flexible enclosure 194. In certain embodiments, the interface circuitry 188 may be disposed outside the flexible enclosure 194.

As discussed above, each flexible coil element 186 may be constructed utilizing a plurality of bundles of conductive fibers that are entwined together. Each bundle includes a plurality of conductive fibers. Each flexible coil element 186 may be made of Litz wire, wire bundles, tinsel wire bundles, plated filament bundle, woven filament bundles, or conductive thread bundle bundles. The conductive fibers within a respective bundles may be entwined (e.g., woven, braided, or twisted) in a variety of patterns. The bundles that are entwined (e.g., woven, braided, or twisted) in a variety of patterns.

Figure 3:
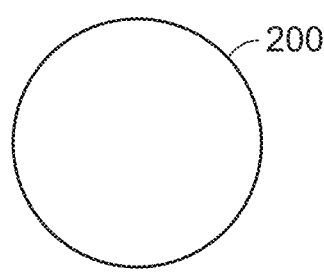
FIG. 3 is a schematic diagram of a cross-section of a conductive fiber (e.g., bare conductive fiber), in accordance with aspects of the present disclosure.

FIG. 3 is a schematic diagram of a cross-section of a conductive fiber 200 that may be utilized to form coil elements. The entirety of the conductive fiber 200 is conductive. In certain embodiments, the conductive fiber may be copper (e.g., silver plated copper). As depicted, the conductive fiber 200 is bare. No cover (dielectric material or shielding layer) is disposed about the conductive fiber 200 itself.

Figure 4:
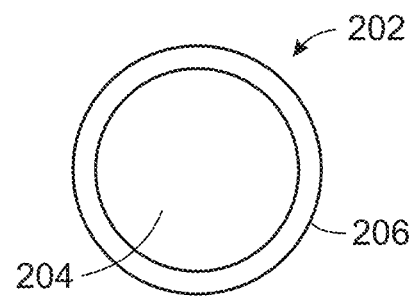
FIG. 4 is a schematic diagram of a cross-section of a conductive fiber (e.g., having a nonconductive core), in accordance with aspects of the present disclosure.

FIG. 4 is a schematic diagram of a cross-section of a conductive fiber 202 (e.g., having a nonconductive core) that may be utilized to form coil elements. The conductive fiber 202 includes a non-conductive core 204 (e.g., plastic or polymer). A concentric conductive layer 206 (e.g., copper or other conductive metal) is disposed about the non-conductive core 204. The concentric conductive layer 206 may be plated on the non-conductive core 204.

Figure 5:
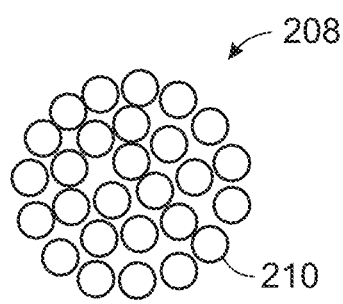
FIG. 5 is a schematic diagram of a cross-section of a bundle of conductive fibers (e.g., bare bundle), in accordance with aspects of the present disclosure.

FIG. 5 is a schematic diagram of a cross-section of a bundle 208 (e.g., bare bundle) of conductive fibers 210 (e.g., conductive fiber 200 in FIG. 3 or conductive fiber 202 in FIG. 4) that may be utilized to form coil elements. The bundle 208 includes a plurality of conductive fibers 210. The plurality of conductive fibers 210 may be entwined (e.g., woven, braided, or twisted) in a variety of patterns within the bundle 208. The number of conductive fibers 210 in the bundle 208 may vary. No cover (e.g., dielectric material or shielding layer) is disposed about the bundle 208 itself.

Figure 6:
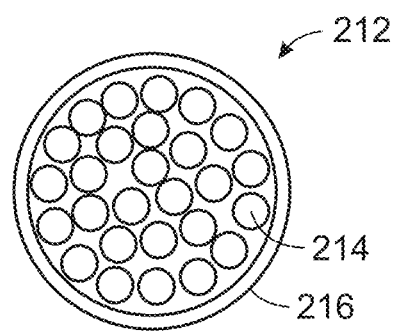
FIG. 6 is a schematic diagram of a cross-section of a bundle of conductive fibers (e.g., having an outer cover), in accordance with aspects of the present disclosure.

FIG. 6 is a schematic diagram of a cross-section of a bundle 212 (e.g., having an outer cover) of conductive fibers 214 (e.g., conductive fiber 200 in FIG. 3 or conductive fiber 202 in FIG. 4). The bundle 212 includes a plurality of conductive fibers 214. The plurality of conductive fibers 214 may be entwined (e.g., woven, braided, or twisted) in a variety of patterns within the bundle 212. The number of conductive fibers 214 in the bundle 212 may vary. A concentric outer layer 216 (e.g., dielectric material and/or shielding layer) is disposed about the plurality of conductive fibers 214. The dielectric material may be rubber, plastic, or some other dielectric material (e.g., fluoroethylenepropylene (FEP) or polytetrafluoroethylene (pTFE)).

Figure 7:
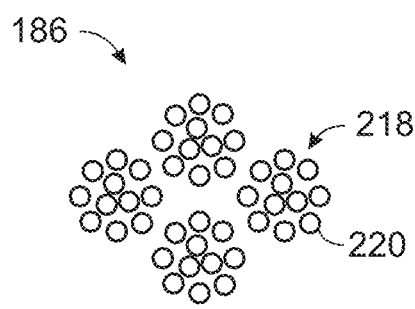
FIG. 7 is a schematic diagram of a cross-section of a coil element having a plurality of entwined bundles (e.g., lacking an outer cover), in accordance with aspects of the present disclosure.

FIG. 7 is a schematic diagram of a cross-section of the coil element 186 (e.g., lacking an outer cover) having a plurality of entwined bundles 218 (e.g., bundle 208 in FIG. 5 or bundle 212 in FIG. 6) of conductive fibers 220. The bundles 218 may be entwined (e.g., woven, braided, or twisted) in a variety of patterns. No cover (e.g., dielectric material or shielding layer) is disposed about the plurality of entwined bundles 218. The number of bundles 218 entwined together may vary. In certain embodiments, the plurality of entwined bundles 218 may be utilized as thread to form coil elements 186 on a flexible anchoring layer. In particular, the coil element 186 has a cross-section configured to generate exact capacitance for element tuning at a specific frequency. The coil element 186 has a distributed capacitance construction. The coil element 186 may be formed of Litz wire, wire bundles, tinsel wire bundles, plated filament bundle, woven filament bundles, or conductive thread bundle bundles.

Figure 8:
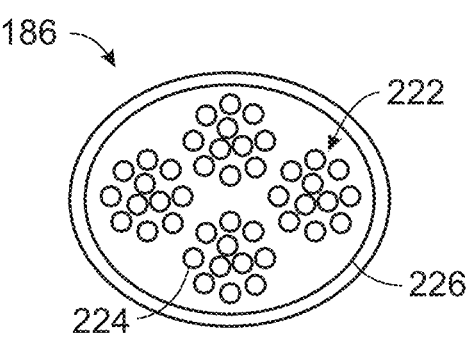
FIG. 8 is a schematic diagram of a cross-section of a coil element having a plurality of entwined bundled (e.g., having an outer cover), in accordance with aspects of the present disclosure.

FIG. 8 is a schematic diagram of a cross-section of a coil element 186 (e.g., having an outer cover) having a plurality of entwined bundles 222 (e.g., bundle 208 in FIG. 5 or bundle 212 in FIG. 6) of conductive fibers 224. The bundles 222 may be entwined (e.g., woven, braided, or twisted) in a variety of patterns. A concentric outer layer 226 (e.g., dielectric material and/or shielding layer) is disposed about the plurality of entwined bundles 222. The dielectric material may be rubber, plastic, or some other dielectric material (e.g., fluoroethylenepropylene (FEP) or polytetrafluoroethylene (pTFE)). The number of bundles 222 entwined together may vary. In certain embodiments, the plurality of entwined bundles 222 may be utilized as thread to form coil elements 186 on a flexible anchoring layer. In particular, the coil element 186 has a cross-section configured to generate exact capacitance for element tuning at a specific frequency. The coil element 186 has a distributed capacitance construction. The coil element 186 may be formed of Litz wire, wire bundles, tinsel wire bundles, plated filament bundle, woven filament bundles, or conductive thread bundle bundles.

Figure 9:
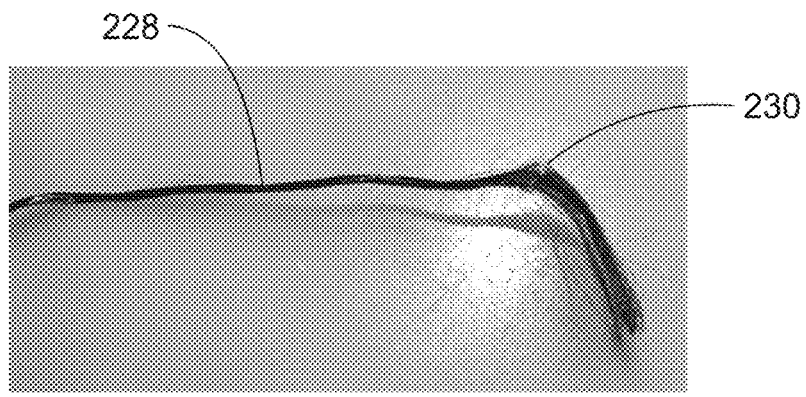
FIG. 9 is an image of an example of a bundle of conductive fibers twisted together, in accordance with aspects of the present disclosure.
Figure 10:
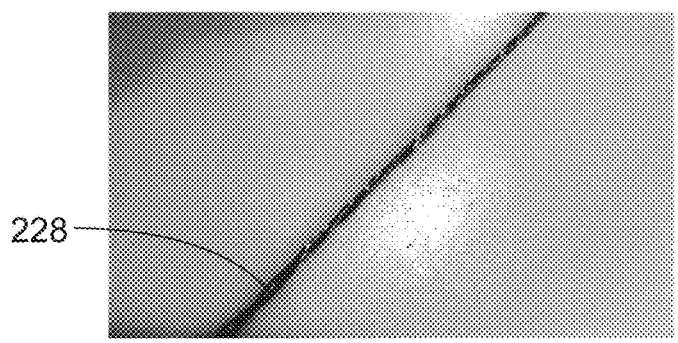
FIG. 10 is an image of an example of two bundles of conductive fibers entwined via twisting, in accordance with aspects of the present disclosure.
Figure 11:
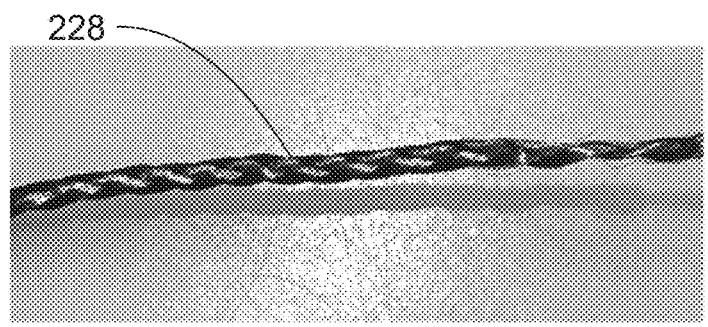
FIG. 11 is an image of three bundles of conductive fibers entwined via braiding, in accordance with aspects of the present disclosure.
Figure 12:
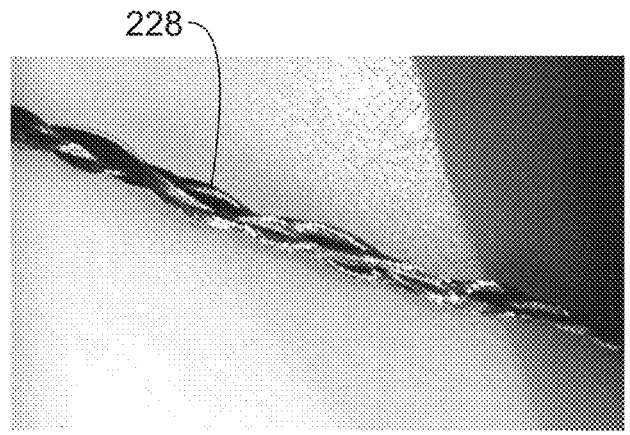
FIG. 12 is am image of three bundles of conductive fibers entwined via twisting, in accordance with aspects of the present disclosure.

FIG. 9 is an image of an example of a bundle 228 of conductive fibers 230 twisted together. For example, the conductive fibers 230 in FIG. 9 have a synthetic polymer core and are clad with copper. The bundle 228 may be utilized as a thread in forming and coupling conductive elements to a flexible mounting material to form a radio frequency coil. FIG. 10 is an image of an example of two of the bundles 228 in FIG. 9 entwined via twisting. The two bundles 228 entwined via twisting may be utilized as a thread in forming and coupling conductive elements to a flexible mounting material to form a radio frequency coil. FIG. 11 is an image of an example of three of the bundles 228 in FIG. 9 entwined via braiding. The three bundles 228 entwined via braiding may be utilized as a thread in forming and coupling conductive elements to a flexible mounting material to form a radio frequency coil. FIG. 12 is an image of an example of three of the bundles 228 in FIG. 9 entwined via twisting. The three bundles 228 entwined via twisting may be utilized as a thread in forming and coupling conductive elements to a flexible mounting material to form a radio frequency coil. The individual bundle 228 or the two or three entwined bundles 228 have small enough diameters to be utilized by a sewing or embroidery machine.

Figure 13:
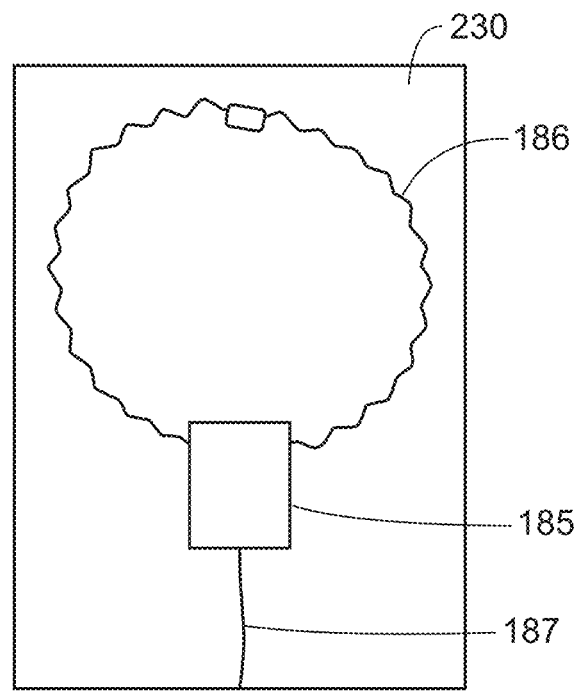
FIG. 13 is a schematic diagram of a conductive element of a radio frequency coil sewn on a flexible anchoring material (e.g., sewn in a zig-zag pattern), in accordance with aspects of the present disclosure.

FIG. 13 is a schematic diagram of the conductive element 186 of a radio frequency coil sewn on a flexible anchoring material 230. The conductive element 186 and the flexible anchoring material 230 may be disposed in a flexible enclosure (e.g., flexible enclosure 194 in FIG. 2). The conductive element 186 is coupled to (e.g., sewn on) the flexible anchoring material 230 utilizing bundles of conductive fibers entwined together as a thread. The conductive element 186 is sewn in a zig-zag pattern or a meandering pattern. The zig-zag pattern enables the conductive element 186 to stretch. The conductive element 186 has a circular shape. As depicted, the conductive element 186 is coupled to the electronics unit 185 which is coupled to the coil-interfacing cable 187. The flexible anchoring material layer 230 is stretchable. In certain embodiments, the flexible anchoring material layer 230 is made of a heat dissipating material. In certain embodiments, the flexible anchoring material layer 230 is magnetic resonance compatible and does not generate a proton signal. In certain embodiments, the flexible anchoring material layer 230 is made of a film (e.g., plastic film). In certain embodiments, the flexible anchoring material layer 230 is made of a fabric.

Figure 14:
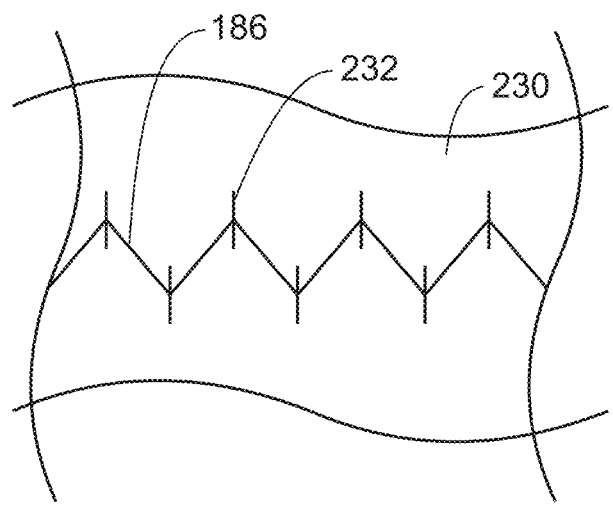
FIG. 14 is a schematic diagram of a portion of the conductive element of the radio frequency coil sewn on the flexible anchoring material, in accordance with aspects of the present disclosure.

As depicted, in FIG. 14 the bundles of conductive fibers entwined together to form the conductive element 186 (and servicing a bottom or bobbin thread) are secured on the flexible anchoring material 230 via a non-conductive thread 232 serving as a top thread. In certain embodiments, the bundles of conductive fibers entwined together may be utilized as the top thread and the non-conductive thread utilized as a bottom thread. In certain embodiments, the bundles of conductive fibers entwined together may be utilized as both a top thread and a bottom thread.

Figure 15:
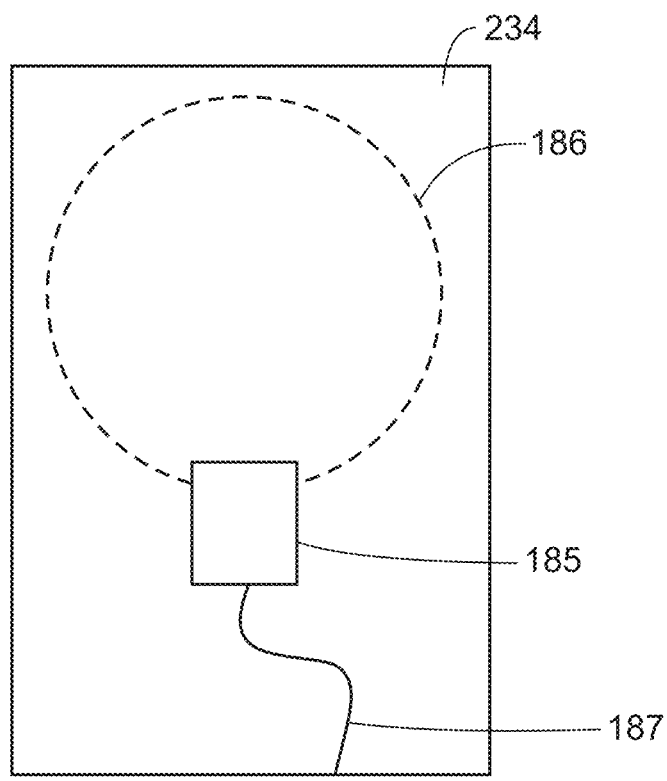
FIG. 15 is a schematic diagram of a conductive element of a radio frequency coil sewn on a flexible anchoring material (e.g., sewn in a linear stitch pattern), in accordance with aspects of the present disclosure.

FIG. 15 is a schematic diagram of the conductive element 186 of a radio frequency coil sewn on the flexible anchoring material 234 (e.g., sewn in a linear stitch pattern). The conductive element 186 and the flexible anchoring material 234 may be disposed in a flexible enclosure (e.g., flexible enclosure 194 in FIG. 2). The conductive element 186 is coupled to (e.g., sewn on) the flexible anchoring material 234 utilizing bundles of conductive fibers entwined together as a thread. The conductive element 186 is sewn in a linear stitch pattern. The conductive element 186 has a circular shape. As depicted, the conductive element 186 is coupled to the electronics unit 185 which is coupled to the coil-interfacing cable 187. The flexible anchoring material layer 234 is not stretchable. In certain embodiments, the flexible anchoring material layer 234 is made of a heat dissipating material. In certain embodiments, the flexible anchoring material layer 234 is magnetic resonance compatible and does not generate a proton signal. In certain embodiments, the flexible anchoring material layer 234 is made of a film (e.g., plastic film). In certain embodiments, the flexible anchoring material layer 234 is made of a fabric.

Figure 16:
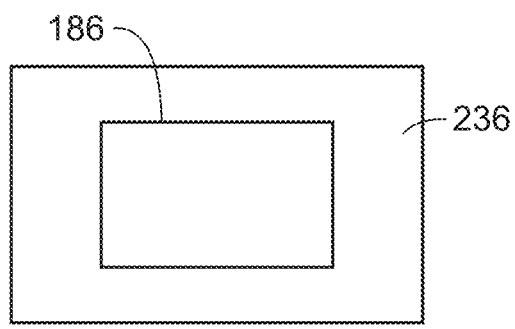
FIG. 16 is a schematic diagram of a conductive element (e.g., having a rectangular shape) of a radio frequency coil sewn on a flexible anchoring material, in accordance with aspects of the present disclosure.
Figure 17:
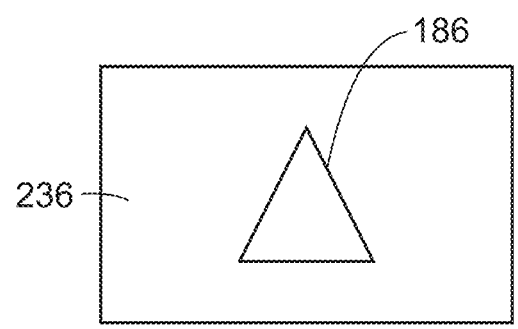
FIG. 17 is a schematic diagram of a conductive element (e.g., having a triangular shape) of a radio frequency coil sewn on a flexible anchoring material, in accordance with aspects of the present disclosure.
Figure 18:
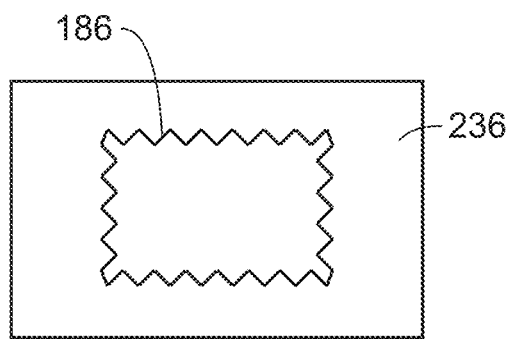
FIG. 18 is a schematic diagram of a conductive element (e.g., having a rectangular shape) of a radio frequency coil sewn (e.g., in a zig-zag pattern) on a flexible anchoring material, in accordance with aspects of the present disclosure.
Figure 19:
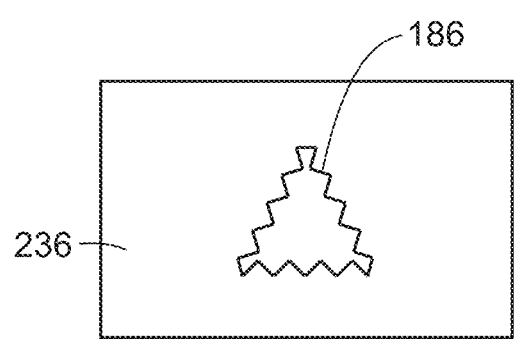
FIG. 19 is a schematic diagram of a conductive element (e.g., having a triangular shape) of a radio frequency coil sewn (e.g., in a zig-zag pattern) on a flexible anchoring material, in accordance with aspects of the present disclosure.

In certain embodiments, the shape of the flexible coil elements may vary and can be any shape (e.g., elliptical, circular, square, rectangular, etc.). For example, FIGS. 16 and 17 depict the conductive element 186 sewn on a flexible anchoring material 236 in a rectangular and triangular shape, respectively. As depicted, in FIGS. 16 and 17, the coil element 186 may follow a straight path along the shape outline. In certain embodiments, the coil element 186 may meander (e.g., zig-zag) along the shape outline as depicted in FIGS. 18 and 19. This enables the coil element 186 to stretch when the flexible anchoring material 236 is stretchable. The conductive element 186 and the flexible anchoring material 236 may be disposed in a flexible enclosure (e.g., flexible enclosure 194 in FIG. 2).

Figure 20:
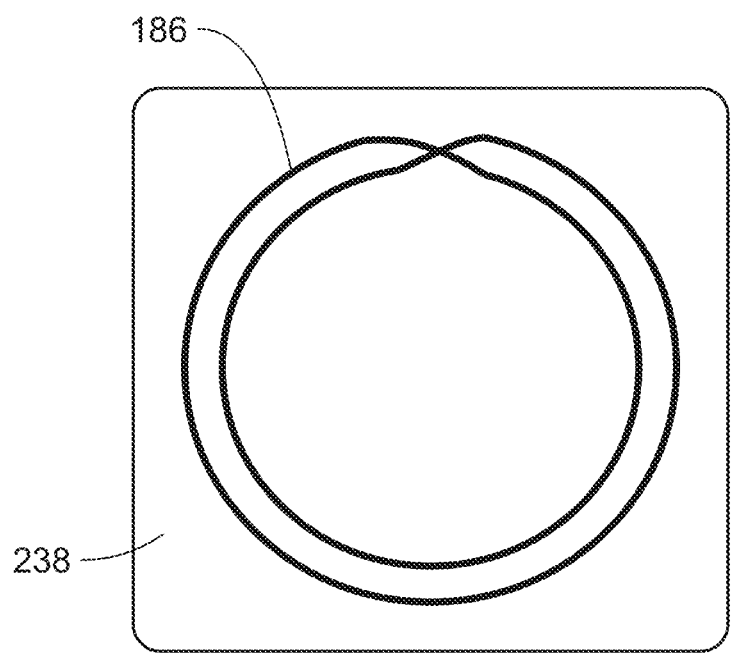
FIG. 20 is a schematic diagram of a conductive element of a radio frequency coil having a multi-turn configuration (e.g., having two turns) sewn on a flexible anchoring material, in accordance with aspects of the present disclosure.
Figure 21:
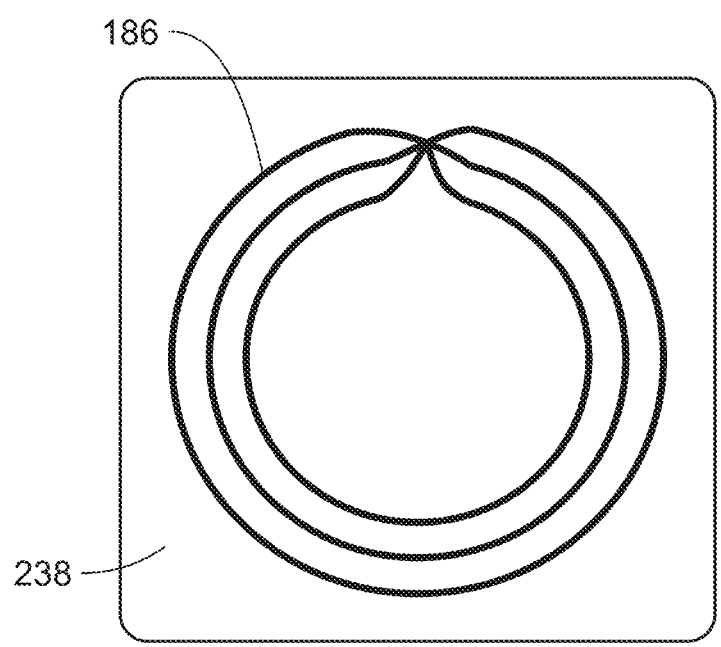
FIG. 21 is a schematic diagram of a conductive element of a radio frequency coil having a multi-coil configuration (e.g., having three turns) sewn on a flexible anchoring material, in accordance with aspects of the present disclosure.

In certain embodiments, the coil element 186 may have a multi-turn configuration. FIGS. 20 and 21 are schematic diagrams of the conductive element 186 of a radio frequency coil having a multi-turn configuration sewn on a flexible anchoring material 238. The conductive element 186 and the flexible anchoring material 238 may be disposed in a flexible enclosure (e.g., flexible enclosure 194 in FIG. 2). As depicted in FIG. 20, the coil element 186 has two turns. As depicted in FIG. 21, the coil element 186 has three turns.

Figure 22:
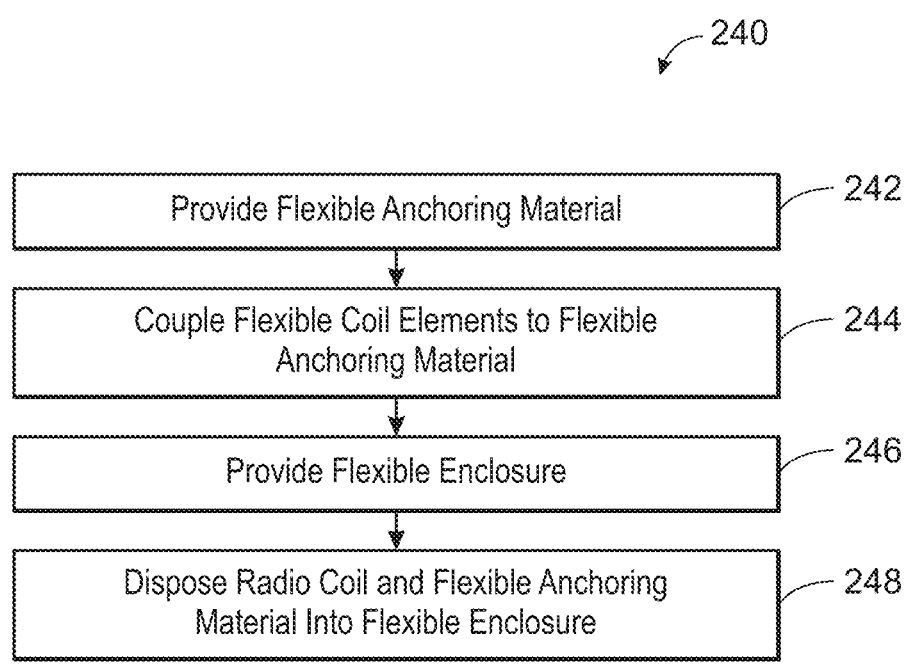
FIG. 22 is a flowchart of a method for manufacturing a radio frequency receiving coil assembly, in accordance with aspects of the present disclosure.

FIG. 22 is a flowchart of a method 240 for manufacturing a radio frequency receiving coil assembly. The method 240 includes providing a flexible anchoring material (block 242). In certain embodiments, the flexible anchoring material layer is stretchable. In certain embodiments, the flexible anchoring material layer is made of a heat dissipating material. In certain embodiments, the flexible anchoring material layer is magnetic resonance compatible and does not generate a proton signal. In certain embodiments, the flexible anchoring material layer is made of a film (e.g., plastic film). In certain embodiments, the flexible anchoring material layer is made of a fabric. The method 240 also includes coupling a plurality of flexible coil elements to the flexible anchoring material to form a radio frequency coil (block 244). Each flexible coil element of the plurality of flexible coil elements includes a plurality of bundles of conductive fibers entwined together. Each bundle of the plurality of bundles includes a plurality of the conductive fibers. In certain embodiments, the plurality of flexible coil elements may be made of Litz wire, wire bundles, tinsel wire bundles, plated filament bundle, woven filament bundles, or conductive thread bundle bundles. In certain embodiments, coupling the plurality of flexible coil elements to the flexible anchoring material includes sewing on the plurality of flexible coil elements on the flexible anchoring material utilizing the plurality of bundles of conductive fibers entwined together as a thread. In certain embodiments, the flexible coil elements may be sewn on utilizing the techniques described in U.S. application Ser. No. 18/313,043, filed on May 5, 2023, which is hereby incorporated in its entirety for all purposes. In certain embodiments, coupling the plurality of flexible coil elements to the flexible anchoring material includes gluing the plurality of flexible coil elements on to the flexible anchoring material. In certain embodiments, a set of flexible coil elements may be coupled to a side of the flexible anchoring material and set of flexible coil elements may be coupled to an opposite side of the flexible anchoring material in a dual-sided arrangement. In certain embodiments, different sets flexible coil elements may be coupled to different and separate layers of the flexible anchoring material in a layered arrangement. In certain embodiments, a combination of the dual-sided arrangement and the layered arrangement may be utilized. The method 240 further includes providing a flexible enclosure (block 246). The method 240 even further includes disposing the flexible anchoring material and the radio frequency coil within a flexible enclosure (block 248).

Figure 23:
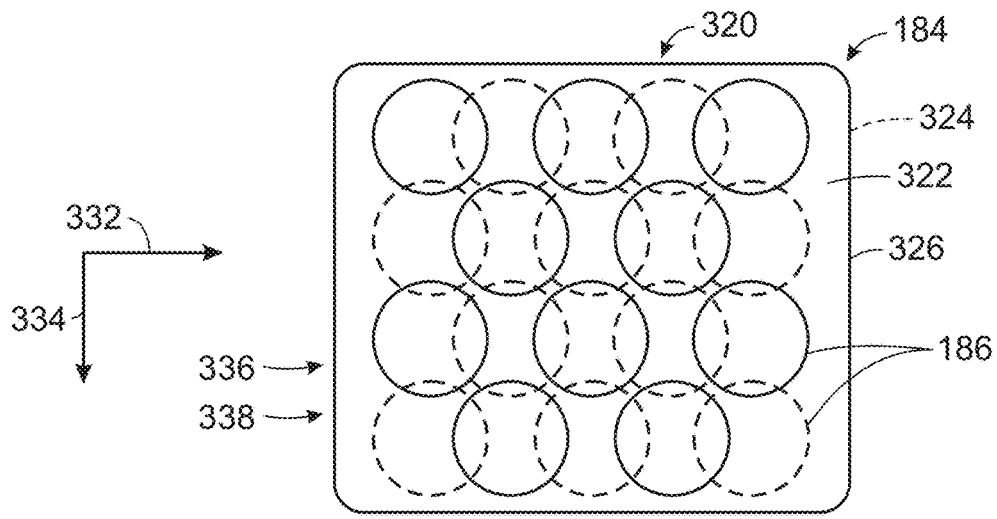
FIG. 23 is a schematic diagram of a coil layout (e.g., for a dual-sided arrangement) for a radio frequency coil, in accordance with aspects of the present disclosure.
Figure 24:
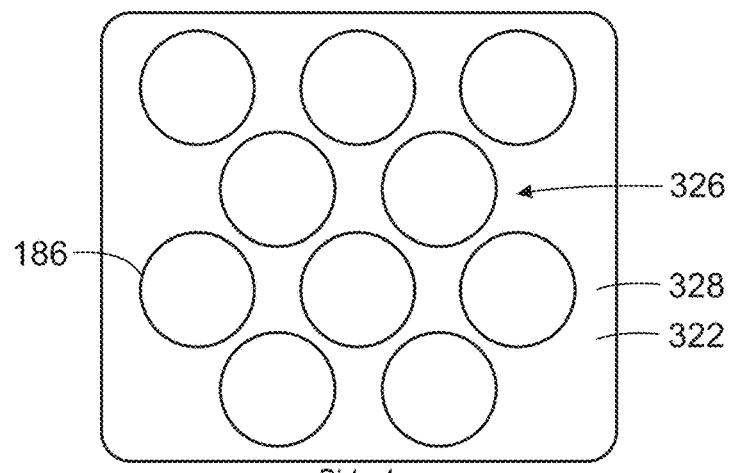
FIG. 24 is a schematic diagram of a first side of the radio frequency coil in FIG. 23, in accordance with aspects of the present disclosure.
Figure 25:
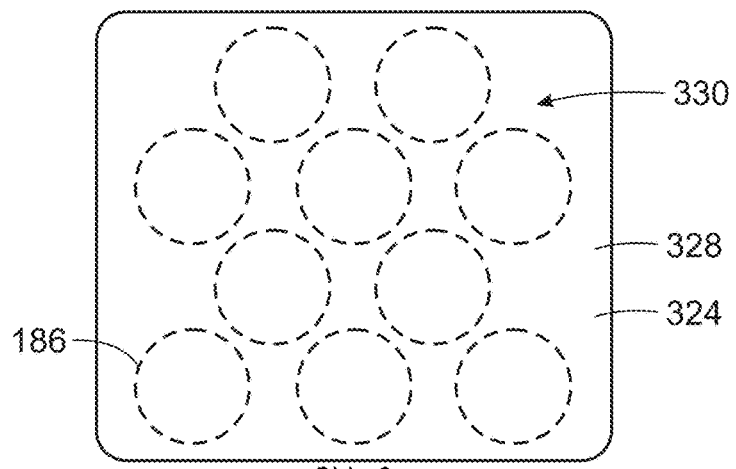
FIG. 25 is a schematic diagram of a second side of the radio frequency coil in FIG. 23, in accordance with aspects of the present disclosure.

FIG. 23 is a schematic diagram of a coil layout 320 (e.g., for a dual-sided arrangement) for the radio frequency coil 184 (of a radio frequency receiving coil assembly). FIGS. 24 and 25 are schematic diagrams of a first side 322 and a second side 324, respectively, of the radio frequency coil 184 in FIG. 23. The radio frequency coil 184 includes a first set 326 of coil elements 186 (e.g., flexible coil elements) coupled on the first side 322 of an anchoring material layer 328 (e.g., flexible anchoring material layer). The radio frequency coil 184 also includes a second set of 330 of coil elements 186 coupled on the second side 324 of the anchoring material layer 328. In certain embodiments, the coil elements 186 may be glued to the anchoring material layer 328. In certain embodiments, the coil elements 186 may be sewed onto the anchoring material layer 328. For example, the conductor of the coil elements 186 may be sewn on the anchoring material layer 328 using a bobbin sewing technique. In certain embodiments, the conductor of the coil elements 186 serves as the bobbin thread and a nonconductive thread (e.g., plastic thread) is utilized as the top thread. In certain embodiments, the conductor of the coil elements 186 serves as the top thread and a nonconductive thread (e.g., plastic thread) is utilized as the bobbin thread. The respective electronic units and coil-interfacing cables for each of the coil elements 186 are not shown. In certain embodiments, the anchoring material layer 328 may include slits for the respective electronic units and coil-interfacing cables for one set of coil elements on one side to be disposed on the opposite side of the anchoring material layer 328 so that all of the electronic units and coil-interfacing cables for all of the coil elements (both sets of coil elements) are all disposed on a single side of the anchoring material layer 328 for easier cabling. The anchoring material layer 328 and the first set 326 and the second set 330 of coil elements 186 are disposed within the flexible enclosure (e.g., flexible enclosure 194 in FIG. 2). The number of coil elements 186 in each set 326, 330 may vary. The number of rows and/or columns and arrangement of the coil elements 186 in each set 326, 330 may vary.

As shown in the coil layout 320 in FIG. 23, respective coil elements 186 of both the first set 326 of coil elements 186 and the second set 330 of coil elements 186 are alternately disposed between each other along a first direction 332 and a second direction 334 (which are orthogonal with respect to each other) along a horizontal plane 336 as defined by the anchoring material layer 328. Each coil element 186 of the first set 326 of coil elements 186 overlaps with at least two coil elements 186 of the second set 330 of coil elements 186 (and vice versa).

Figure 26:
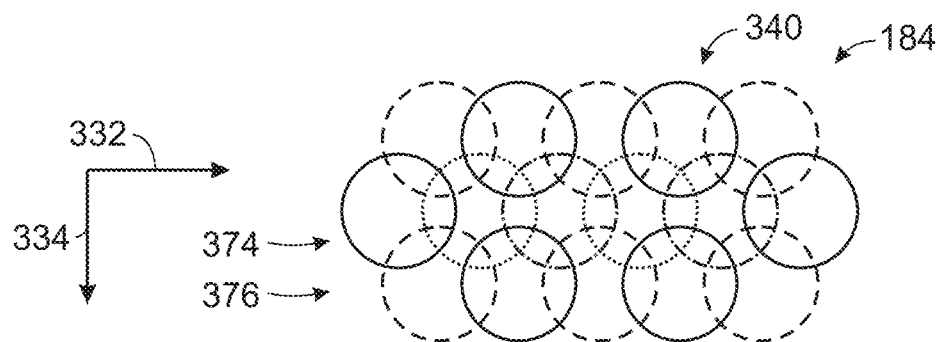
FIG. 26 is a schematic diagram of a coil layout (e.g., for a layered arrangement) for a radio frequency coil, in accordance with aspects of the present disclosure.
Figure 27:
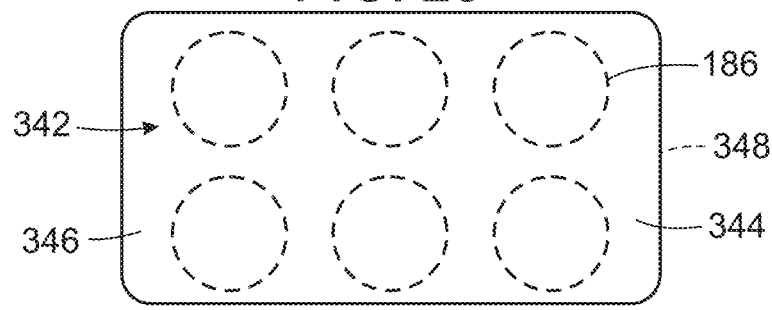
FIG. 27 is a schematic diagram of a first set of coil elements on a first layer for the radio frequency coil in FIG. 26, in accordance with aspects of the present disclosure.
Figure 28:
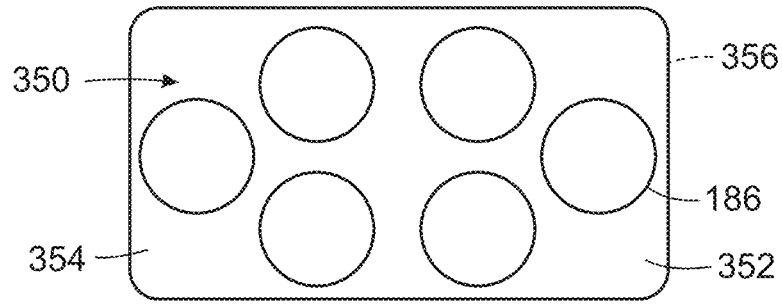
FIG. 28 is a schematic diagram of a second set of coil elements on a second layer for the radio frequency coil in FIG. 26, in accordance with aspects of the present disclosure.
Figure 29:
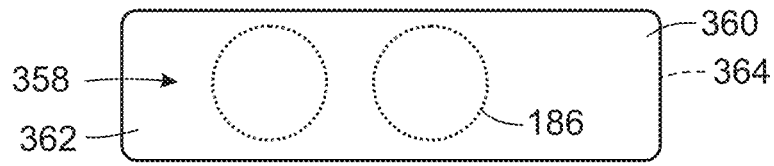
FIG. 29 is a schematic diagram of a third set of coil elements on a third layer for the radio frequency coil in FIG. 26, in accordance with aspects of the present disclosure.
Figure 30:
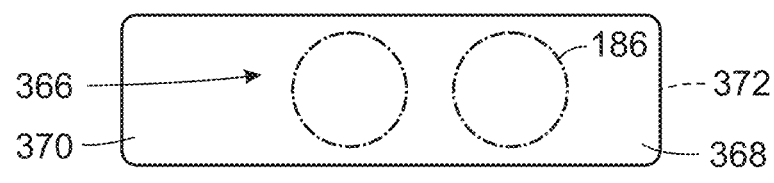
FIG. 30 is a schematic diagram of a fourth set of coil elements on a fourth layer for the radio frequency coil in FIG. 26, in accordance with aspects of the present disclosure.

FIG. 26 is a schematic diagram of a coil layout 340 (e.g., for a layered arrangement) for the radio frequency coil 184 (of a radio frequency receiving coil assembly). FIGS. 27-30 are schematic diagrams of different sets of coil elements 186 on different layers for the radio frequency coil 184 in FIG. 26. The coil layout 340 depicts the arrangement of all of the coil elements 186 on the different layers relative to each other.

The radio frequency coil 184 includes a first set 342 of coil elements 186 (e.g., flexible coil elements) coupled on side 344 of an anchoring material layer 346 (e.g., flexible anchoring material layer) and no coil elements disposed on opposite side 348 of the anchoring material layer 346. The radio frequency coil 184 also includes a second set 350 of coil elements 186 (e.g., flexible coil elements) coupled on side 352 of an anchoring material layer 354 (e.g., flexible anchoring material layer) and no coil elements disposed on opposite side 356 of the anchoring material layer 354. The radio frequency coil 184 further includes a third set 358 of coil elements 186 (e.g., flexible coil elements) coupled on side 360 of an anchoring material layer 362 (e.g., flexible anchoring material layer) and no coil elements disposed on opposite side 364 of the anchoring material layer 362. The radio frequency coil 184 even further includes a fourth set 366 of coil elements 186 (e.g., flexible coil elements) coupled on side 368 of an anchoring material layer 370 (e.g., flexible anchoring material layer) and no coil elements disposed on opposite side 372 of the anchoring material layer 370.

The anchoring material layer 362 is stacked on the anchoring material layer 370 so that the side 368 (and coil elements 186 on the side 368) interface with the side 364 of the anchoring material layer 362. The anchoring material layer 354 is stacked on the anchoring material layer 362 so that the side 360 (and coil elements 186 on the side 360) interface with the side 356 of the anchoring material layer 354. The anchoring material layer 346 is stacked on the anchoring material layer 354 so that the side 352 (and coil elements 186 on the side 352) interface with the side 348 of the anchoring material layer 346.

In certain embodiments, the coil elements 186 may be glued to the respective anchoring material layers 346, 354, 362, and 370. In certain embodiments, the coil elements 186 may be sewed onto the respective anchoring material layers 346, 354, 362, and 270. For example, the conductor of the coil elements 186 may be sewn on the anchoring material layers 346, 354, 362, and 370 using a bobbin sewing technique. In certain embodiments, the conductor of the coil elements 186 serves as the bobbin thread and a nonconductive thread (e.g., plastic thread) is utilized as the top thread. In certain embodiments, the conductor of the coil elements 186 serves as the top thread and a nonconductive thread (e.g., plastic thread) is utilized as the bobbin thread. The respective electronic units and coil-interfacing cables for each of the coil elements 186 are not shown. In certain embodiments, some of the anchoring material layers 346, 354, 362, and 370 may include slits for the respective electronic units and coil-interfacing cables for one or more sets of coil elements on one or more of the anchoring material layers 346, 354, 362, and 370 to be disposed on a single side of one of the anchoring material layers 346, 354, 362, and 370 so that all of the electronic units and coil-interfacing cables for all of the coil elements (of all the sets of coil elements) are all disposed on the single side of only one of the anchoring material layers 346, 354, 362, and 370 for easier cabling. The anchoring material layers 346, 354, 362, and 370 and the sets 342, 350, 358, and 366 of coil elements 186 are disposed within the flexible enclosure (e.g., flexible enclosure 194 in FIG. 2). The number of coil elements 186 in each set 342, 350, 358, and 366 may vary. The number of rows and/or columns and arrangement of the coil elements 186 in each set 342, 350, 358, and 366 may vary. Both the number of sets of coil elements 186 and the corresponding number of anchoring material layers may vary.

In certain embodiments, one or more of the flexible anchoring material layers 346, 354, 362, and 370 is stretchable. In certain embodiments, one or more of the flexible anchoring material layers 346, 354, 362, and 370 are made of a heat dissipating material. In certain embodiments, one or more of the flexible anchoring material layers 346, 354, 362, and 370 are magnetic resonance compatible and do not generate a proton signal. In certain embodiments, one or more of the flexible anchoring material layers 346, 354, 362, and 370 are made of a film (e.g., plastic film). In certain embodiments, one or more of the flexible anchoring material layers 346, 354, 362, and 370 are made of a fabric.

As shown in the coil layout 340 in FIG. 26, respective coil elements 186 of the different sets 342, 350, 358, and 366 of coil elements 186 are alternately disposed between each other along the first direction 332 and the second direction 334 (which are orthogonal with respect to each other) along a horizontal plane 374 as defined by the stacked anchoring material layers 346, 354, 362, and 370. At least one coil element 186 of each set 342, 350, 358, and 366 of coil elements 186 overlaps with at least one coil element 186 of two or more of the other sets 342, 350, 358, 366 of coil elements 186.

Figure 31:
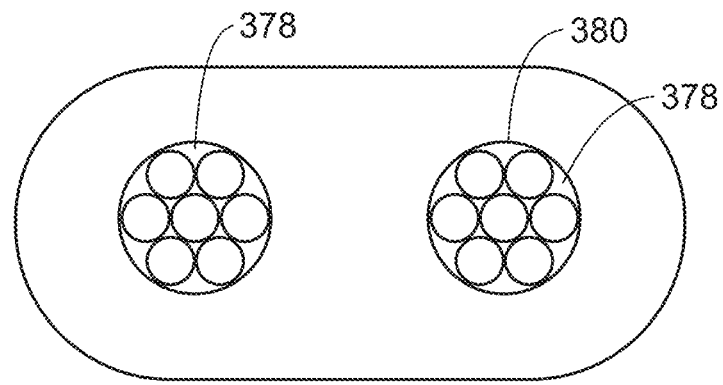
FIG. 31 is a cross-sectional view of a pair of elasticized or stretchable conductive fiber bundles 378 in a twinaxial configuration.
Figure 32:
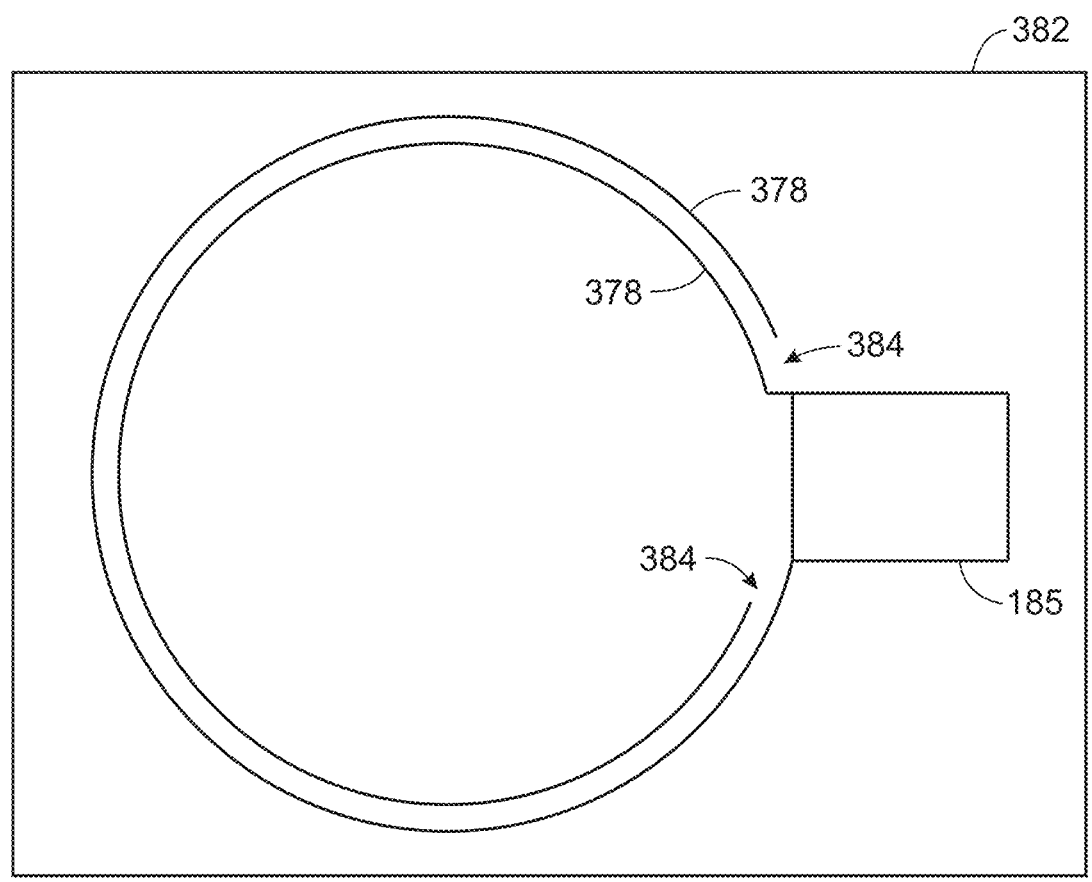
FIG. 32 is a schematic diagram of a conductive element of a radio frequency coil in a twinaxial configuration sewn on a flexible anchoring material.

In certain embodiments, the coil elements 186 of a radio frequency coil may made of elasticized or stretchable conductive fiber bundles sewn in a twinaxial/twinax wire configuration on the flexible or stretchable anchoring material layer. FIG. 31 depicts a cross-sectional view of a pair of elasticized or stretchable conductive fiber bundles 378 (e.g., of the coil element 186) in a twinaxial configuration. Each fiber bundle 378 is disposed or enclosed within a dielectric material 380. In certain embodiments, an outer jacket/cover may also be disposed about the fiber bundles 378. The bundle thickness of each fiber bundle 378 (e.g., via either fiber thickness or number of filaments within the fiber bundle 378), the spacing between the fiber bundles 378, and/or the length of each fiber bundle 378 may be altered to change the capacitance per unit length. This enables the coil elements 186 to be tuned to a desire frequency. This also replaces the need for adding a capacitive break (e.g., as illustrated by the small rectangle representing a printed circuit board with a capacitor in FIG. 13). FIG. 32 depicts the fiber bundles 378 sewn in the twinaxial configuration on a flexible or stretchable anchoring material layer 382. As depicted, the fiber bundles 378 are sewn on the flexible or stretchable anchoring material layer 382 in a straight manner. In certain embodiments, the fiber bundles 378 are sewn on the flexible or stretchable anchoring material layer 382 in a meandering manner. As depicted, each fiber bundle 378 is coupled to the electronics unit or module 185. As depicted, each fiber bundle 378 includes a shortened length or notch 384 taken out to tune the coil element 186. In certain embodiments, the shortened length or notch 384 may be taken out of only one of the fiber bundles 378.

Technical effects of the disclosed subject matter include enabling the utilization of bundles of conductive fibers entwined (e.g., braided, twisted, or woven) together to form coil elements of a radio frequency coil. The technical effects of the disclosed subject matter also include providing for lighter weight and more flexible alternatives to traditional wire-based conductors, while being cheaper but providing similar conductivity and performance. The technical effects of the disclosed subject matter further include enabling for a coil assembly that is both lighter and more flexible, thus, enhancing patient comfort as well enabling easier positioning of the coil assembly that could lead to higher throughput when utilizing the magnetic resonance imaging system. The technical effects of the disclosed subject matter even further include enabling for the manufacturing of a coil at reduced cost due to the decreased cost of the conductors and in a quicker manner (e.g., using sewing or embroidery techniques). The technical effects of the disclosed subject matter yet further include enabling easy sewing of the coil elements on an anchoring fabric or heat dissipative fabric to provide a wearable style coil array that is highly adaptive to the anatomy on which it is utilized. The technical effects of the disclosed subject matter further include enabling the bundles of the conductive fibers to be woven or braided into custom configurations that reduce resistance, equally distribute current, and improve performance. The technical effects of the disclosed subject matter further includes enabling the radio frequency coil to reduce reflections (e.g., due to less metal) in a positron emission tomography scanner when utilized in a PET/MR scanner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more coil elements designated as "means for [perform]ing [a function] . . . " or "step for [perform]ing [a function] . . . ", it is intended that such coil elements are to be interpreted under 35 U.S.C. 112(f). However, for any claims containing coil elements designated in any other manner, it is intended that such coil elements are not to be interpreted under 35 U.S.C. 112(f).

This written description uses examples to disclose the present subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural coil elements that do not differ from the literal language of the claims, or if they include equivalent structural coil elements with insubstantial differences from the literal languages of the claims.

The invention claimed is:

1. A radio frequency receiving coil assembly for a magnetic resonance imaging system, comprising:
   a flexible enclosure;
   a flexible anchoring material disposed within the flexible enclosure; and
   a radio frequency coil disposed within the flexible enclosure, wherein the radio frequency coil comprises a plurality of flexible coil elements coupled to the flexible anchoring material, wherein each flexible coil element of the plurality of flexible coil elements comprises a plurality of separate bundles of conductive fibers entwined together in a twisted or braided arrangement, and each separate bundle of the plurality of separate bundles comprises a plurality of the conductive fibers entwined together.

2. The radio frequency receiving coil assembly of claim 1, wherein the plurality of flexible coil elements are sewn on the flexible anchoring material utilizing the plurality of separate bundles of conductive fibers entwined together as a thread.

3. The radio frequency receiving coil assembly of claim 2, wherein the plurality of flexible coil elements are sewn on the flexible anchoring material as a top thread.

4. The radio frequency receiving coil assembly of claim 2, wherein the plurality of flexible coil elements are sewn on the flexible anchoring material as a bottom thread.

5. The radio frequency receiving coil assembly of claim 2, wherein the plurality of flexible coil elements are sewn on the flexible anchoring material in a zig-zag pattern, wherein the plurality of flexible coil elements are configured to be stretchable due to the zig-zag pattern.

6. The radio frequency receiving coil assembly of claim 5, wherein the flexible anchoring material is stretchable.

7. The radio frequency receiving coil assembly of claim 2, wherein the plurality of flexible coil elements are sewn on the flexible anchoring material via a linear stitch pattern.

8. The radio frequency receiving coil assembly of claim 1, wherein each conductive fiber of the plurality of the conductive fibers comprises a non-conductive core and a conductive cover disposed about the non-conductive core.

9. The radio frequency receiving coil assembly of claim 1, wherein each conductive fiber of the plurality of the conductive fibers comprises a conductive core, and each separate bundle of the plurality of separate bundles has a non-conductive cover disposed about a respective bundle.

10. The radio frequency receiving coil assembly of claim 1, wherein each conductive fiber of the plurality of the conductive fibers comprises a conductive core, and the plurality of separate bundles entwined together has a non-conductive cover disposed about the plurality of separate bundles entwined together.

11. The radio frequency receiving coil assembly of claim 1, wherein the plurality of separate bundles entwined together are bare.

12. The radio frequency receiving coil assembly of claim 1, wherein each flexible coil element of the plurality of flexible coil elements coupled to the flexible anchoring material in a multi-turn configuration.

13. A method for manufacturing a radio frequency receiving coil assembly for a magnetic resonance imaging system, comprising:
   providing a flexible anchoring material;
   coupling a plurality of flexible coil elements to the flexible anchoring material to form a radio frequency coil, wherein each flexible coil element of the plurality of flexible coil elements comprises a plurality of separate bundles of conductive fibers entwined together in a twisted or braided arrangement, and each separate bundle of the plurality of separate bundles comprises a plurality of the conductive fibers entwined together; and
   disposing the flexible anchoring material and the radio frequency coil within a flexible enclosure.

14. The method of claim 13, wherein coupling the plurality of flexible coil elements to the flexible anchoring material comprises sewing on the plurality of flexible coil elements on the flexible anchoring material utilizing the plurality of separate bundles of conductive fibers entwined together as a thread.

15. The method of claim 14, wherein the plurality of flexible coil elements are sewn on the flexible anchoring material as a top thread.

16. The method of claim 14, wherein the plurality of flexible coil elements are sewn on the flexible anchoring material as a bottom thread.

17. The method of claim 14, wherein the plurality of flexible coil elements are sewn on the flexible anchoring material in a zig-zag pattern, wherein the plurality of flexible coil elements are configured to be stretchable due to the zig-zag pattern.

18. The method of claim 17, wherein the flexible anchoring material layer is stretchable.

19. The method of claim 14, wherein the plurality of flexible coil elements are sewn on the flexible anchoring material via a linear stitch pattern.

20. A magnetic resonance imaging system, comprising:
an imaging portion having a radio frequency receiving coil assembly, wherein the radio frequency receiving coil assembly comprises:
a flexible enclosure;
a flexible anchoring material disposed within the flexible enclosure; and
a radio frequency coil disposed within the flexible enclosure, wherein the radio frequency coil comprises a plurality of flexible coil elements sewn on the flexible anchoring material, wherein each flexible coil element of the plurality of flexible coil elements comprises a plurality of separate bundles of conductive fibers entwined together in a twisted or braided arrangement, each separate bundle of the plurality of separate bundles comprises a plurality of the conductive fibers entwined together, and the plurality of separate bundles of conductive fibers entwined together is utilized as a thread to sew the plurality of flexible coil elements on the flexible anchoring material.

\* \* \* \* \*